United States Patent [19]

Thomaswick

[11] 4,193,736
[45] Mar. 18, 1980

[54] RAILWAY CAR LOOSE SHEET MATERIAL SHIPPING SUPPORT LOADING ARRANGEMENT

[75] Inventor: Ronald J. Thomaswick, Kittanning, Pa.

[73] Assignee: PPG Industries, Inc., Pittsburgh, Pa.

[21] Appl. No.: 938,209

[22] Filed: Aug. 30, 1978

Related U.S. Application Data

[62] Division of Ser. No. 634,688, Nov. 24, 1975, Pat. No. 4,127,071.

[51] Int. Cl.² .................. B60P 7/10; B61D 3/08; B65J 67/02; B65J 69/00
[52] U.S. Cl. .................. 414/786; 410/34; 410/121
[58] Field of Search .......... 105/366 R, 366 E, 366 B, 105/366 C, 366 D, 367, 368 R, 368 T, 368 B, 368 S, 377, 380, 470; 206/454; 211/41; 214/10.5 R; 224/42.1 E, 42.1 F; 280/143, 144, 179 A; 414/786

[56] References Cited

U.S. PATENT DOCUMENTS

| | | | |
|---|---|---|---|
| 631,841 | 8/1899 | Wood | 214/10.5 R X |
| 1,454,037 | 5/1923 | Byrne | 280/143 X |
| 1,730,777 | 10/1929 | Mayer | 280/144 |
| 1,762,245 | 6/1930 | Schmohl | 105/380 |
| 1,960,805 | 5/1934 | Clark et al. | 211/41 |
| 1,996,965 | 4/1935 | Bigley, Jr. | 280/144 |
| 2,005,099 | 6/1935 | McLeod | 211/41 |
| 2,366,337 | 1/1945 | Kreuter et al. | 105/367 X |
| 2,805,014 | 9/1957 | Oslund | 224/42.11 E |
| 2,940,402 | 6/1960 | Hansen et al. | 105/367 |
| 2,973,174 | 2/1961 | Stanwick et al. | 105/368 S X |
| 3,251,314 | 5/1966 | Gutridge | 105/366 B |
| 3,520,257 | 7/1970 | James | 105/377 |
| 3,776,437 | 12/1973 | Carney | 224/42.1 F X |
| 3,878,942 | 4/1975 | Hansen et al. | 206/454 |
| 3,901,421 | 8/1975 | Kalicki et al. | 224/42.1 E X |
| 3,921,538 | 11/1975 | Bundy | 105/367 |
| 4,127,071 | 11/1978 | Thomaswick | 105/367 |

Primary Examiner—Joseph F. Peters, Jr.
Assistant Examiner—Howard Beltran
Attorney, Agent, or Firm—Donald Carl Lepiane

[57] ABSTRACT

A railcar for shipping loose or individual glass sheets includes moveable deck runners each having a moveable stanchion having a surface for supporting the sheets in a generally vertical position with the major surface of the sheets generally parallel to the longitudinal axis of the railcar. The railcar is loaded and/or unloaded from one side. The glass sheets are protected from the weather during shipping and storing by a telescoping fiber glass cover.

2 Claims, 18 Drawing Figures

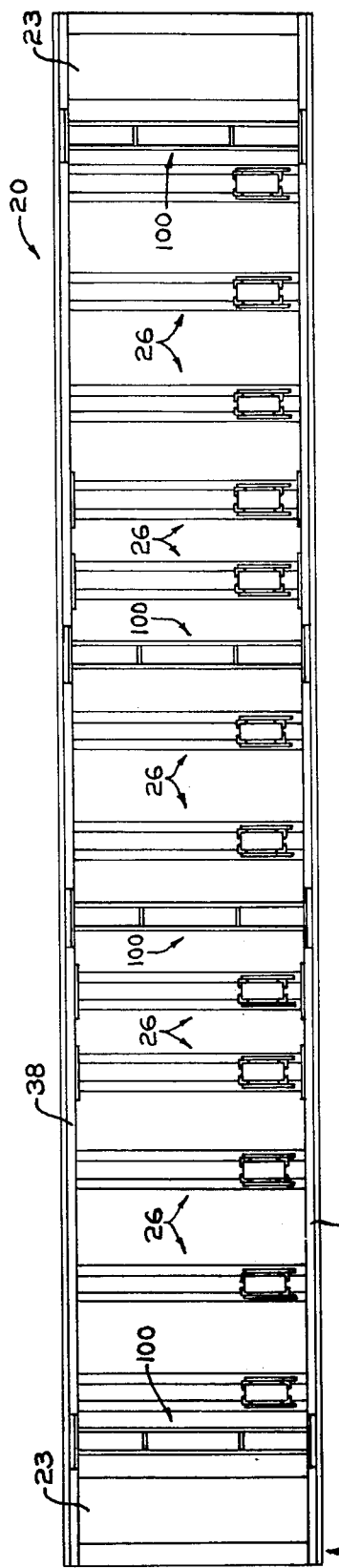
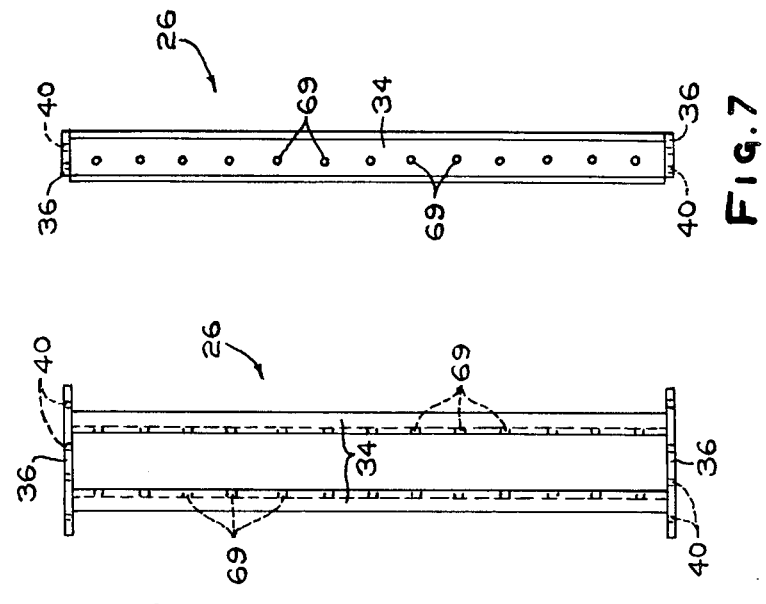
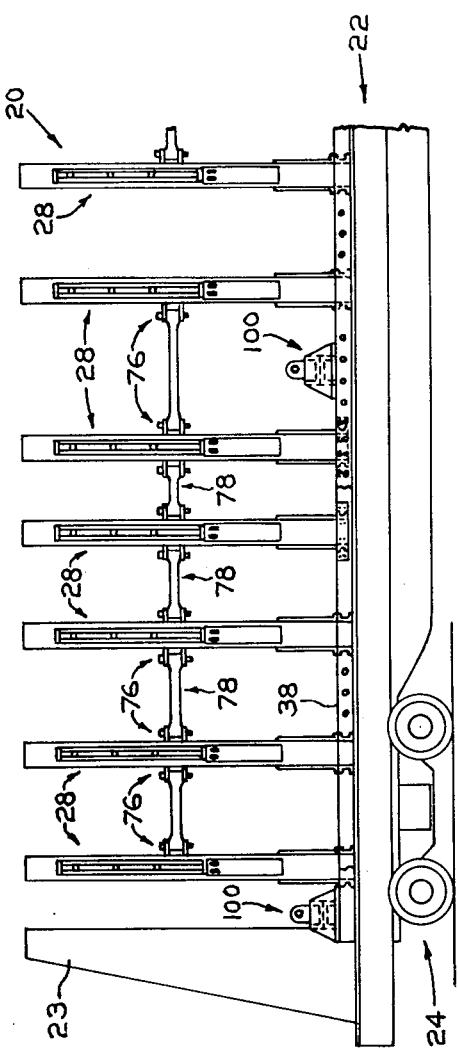

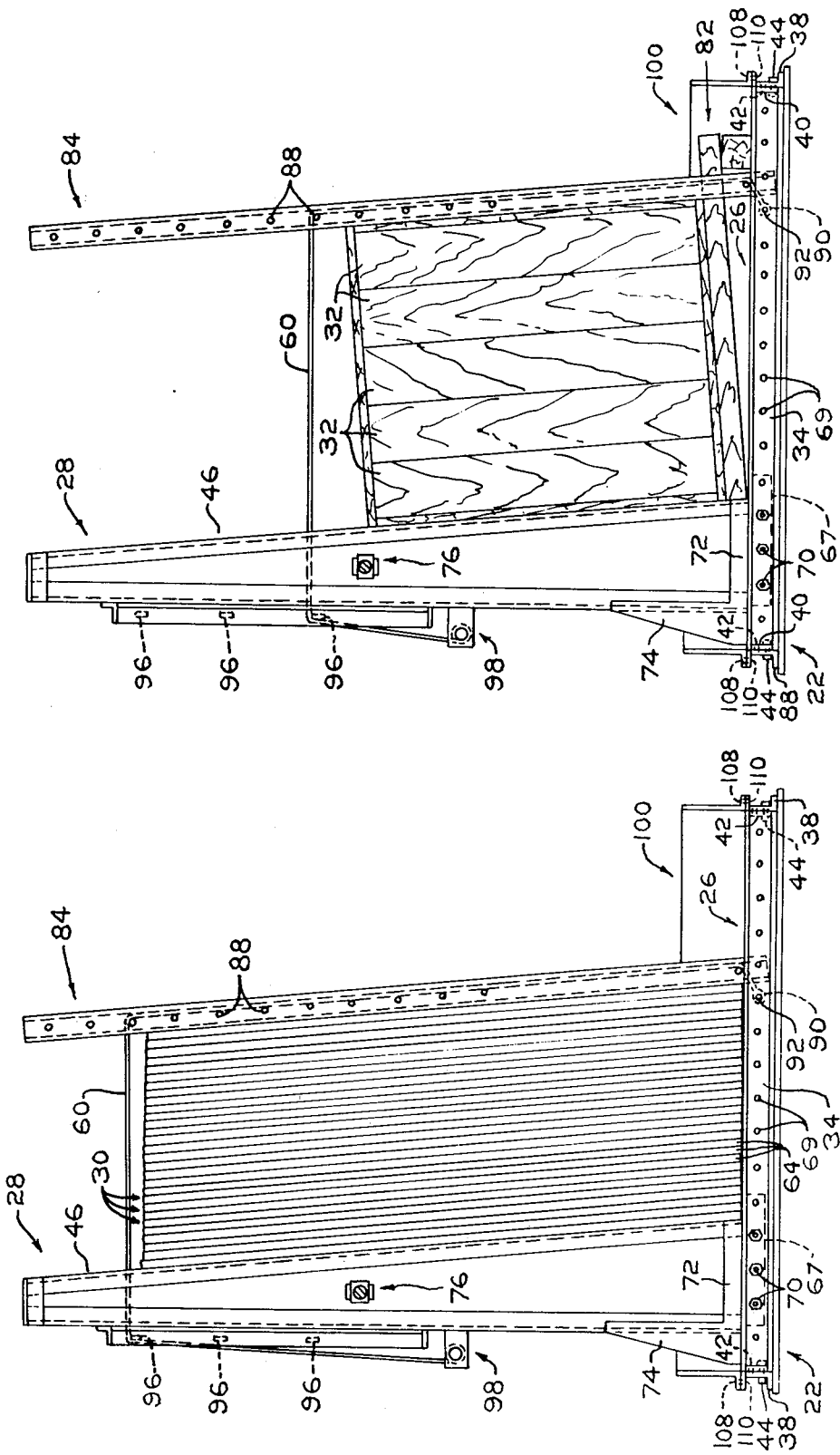

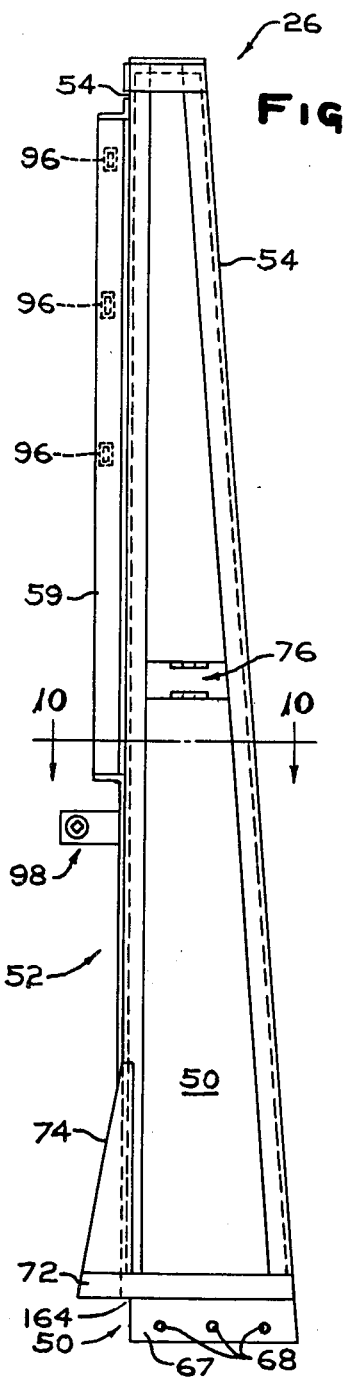
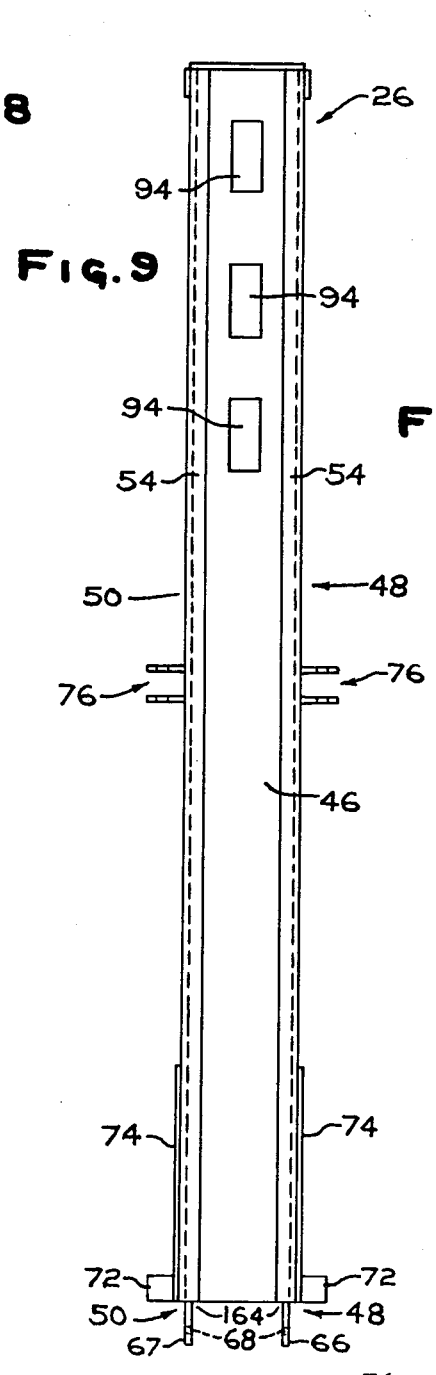
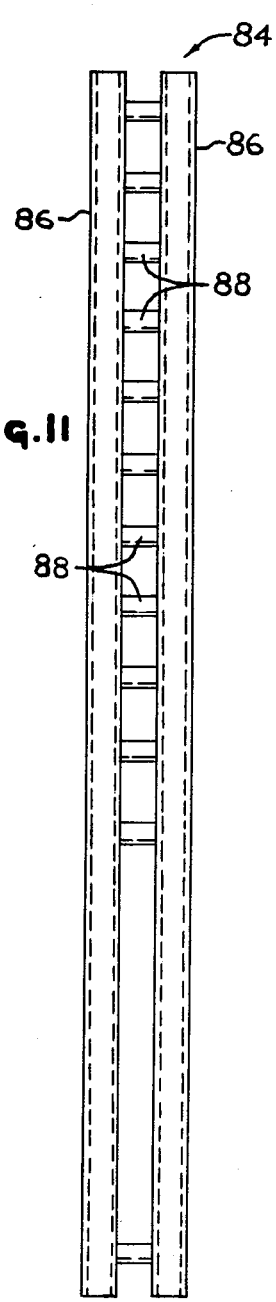
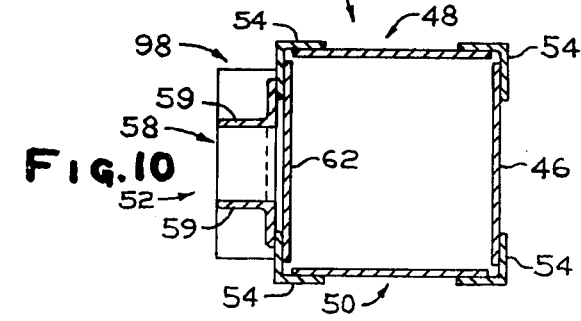

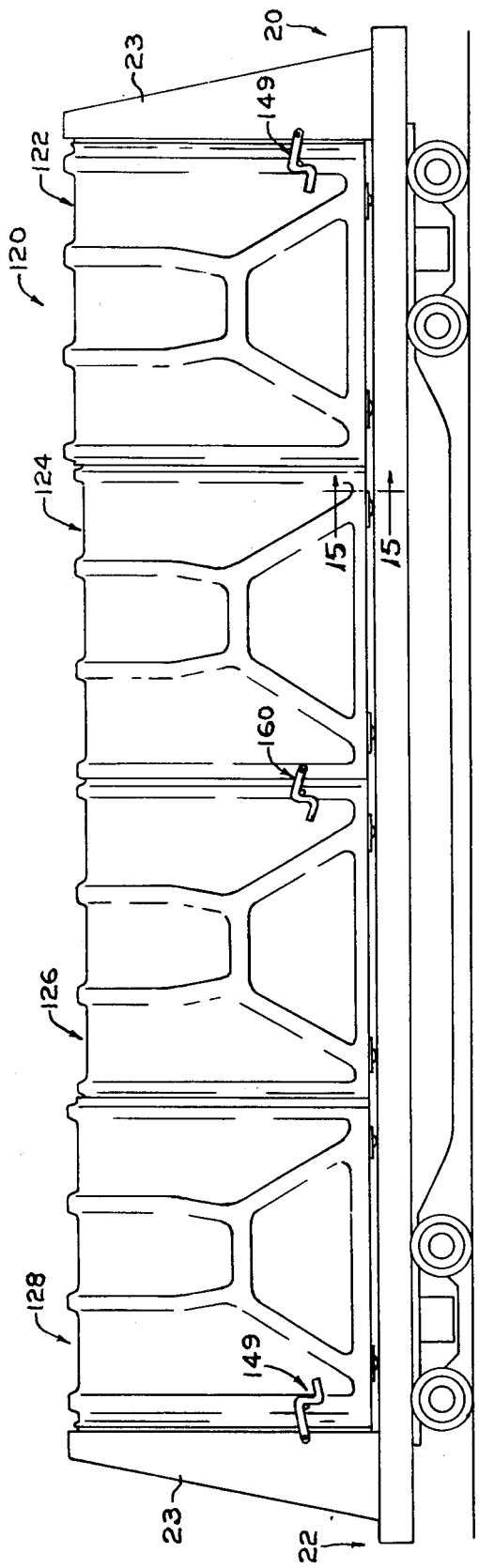
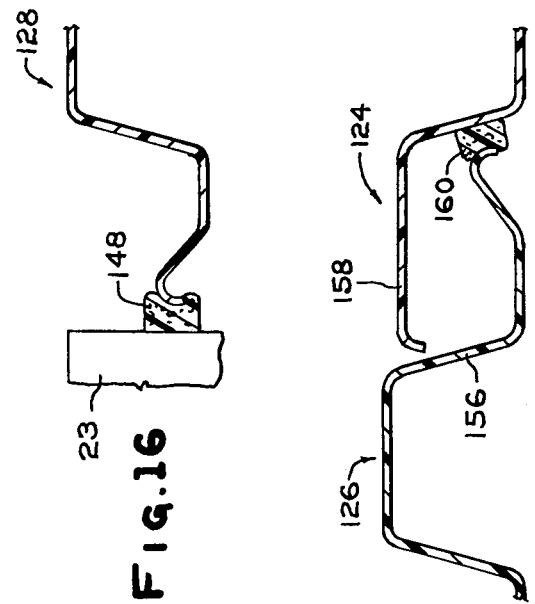
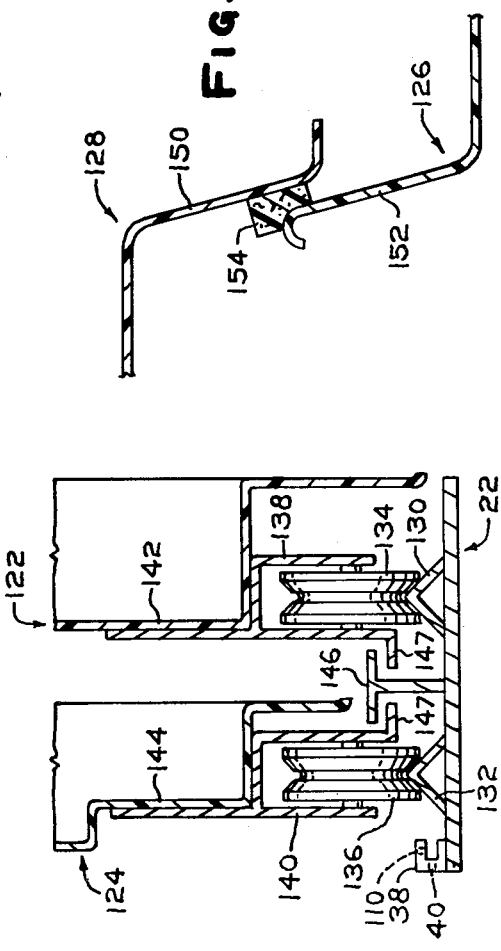

4,193,736

RAILWAY CAR LOOSE SHEET MATERIAL SHIPPING SUPPORT LOADING ARRANGEMENT

This is a division of application Ser. No. 634,688, filed Nov. 24, 1975, now U.S. Pat. No. 4,127,071.

BACKGROUND OF THE INVENTION

1. Field of the Invention:

This invention relates to a railcar for shipping sheet material, e.g., glass sheets and/or crates and more particularly, to a railcar for shipping glass sheets that are loaded and/or unloaded from one side thereof.

2. Discussion of the Technical Problems:

As is known, under certain conditions, it is more economical to ship loose or individual glass sheets by railcar than by truck.

In general, the railcar for shipping loose or individual glass sheets includes an "A" frame mounted in the center of a flat bed railcar or in a gondola railcar. Retaining facilities maintain the glass sheets against the "A" frame in a generally vertical position.

The above type of glass shipping railcars have drawbacks. More particularly, a crane with a high boom is used to load the railcar from one side. The boom has to be high enough to lift the glass sheets over the "A" frame and the sides of the gondola railcar when loading from one side only.

The use of a crane having a high boom is not practical for unloading railcars because the glass unloaded from the railcar has to be moved into a structure. Therefore other expediencies are used to unload railcar having "A" frames. One method is to remove the glass from one side, turn the railcar around and remove the glass from the other side.

Glass can be removed from gondola railcars having an "A" frame by raising the glass above the bed of the railcar and then moving the railcar relative to the raised glass until the side of the railcar clears the raised glass sheets.

As can be appreciated each time a railcar is moved an expense is incurred. It will be advantageous therefore if a railcar is available that does not have the drawbacks of the presently available railcars.

SUMMARY OF THE INVENTION

This invention relates to an improved railcar for shipping articles, e.g., loose glass sheets or crates. The railcar is of the type having a flat bed supported on a pair of spaced wheel carriages or trucks. The improvement includes a plurality of lateral runners secured on the flat bed in spaced relation to each other to provide a supporting surface spaced above the surface of the flat bed. A stanchion has one end secured to each of the lateral runners to provide a vertical supporting surface.

This invention also relates to a method of loading articles, e.g., loose glass sheets having a predetermined width, length and thickness on a railcar. A plurality of deck runners are secured on a flat bed of a railcar in predetermined spaced relationship to each other to provide a supporting surface above the surface of the bed of the railcar. A stanchion is secured to each of the deck runners such that the center of gravity of the stanchion and articles to be loaded is at the longitudinal center of the railcar. The articles are loaded on the deck runners and stanchion and secured thereto by restraining facilities to prevent lateral motion of the articles. Thereafter end restraints are secured to the bed of the railcar to prevent longitudinal motion of the articles.

BRIEF DESCRIPTION OF THE DRAWINGS

FIG. 1 is a plan view of a railcar incorporating features of the invention;

FIG. 2 is a partial side view of the railcar of FIG. 1;

FIG. 4 is a view taken along lines 4—4 of FIG. 3;

FIG. 5 is a view taken along lines 5—5 of FIG. 3;

FIG. 6 is a plan view of a deck runner incorporating features of the invention;

FIG. 7 is a side view of the deck runners of FIG. 6;

FIG. 8 is a side view of a stanchion incorporating features of the invention;

FIG. 9 is a front view of the stanchion of FIG. 8;

FIG. 10 is a view taken along lines 10—10 of FIG. 8 and having portions removed for purposes of clarity;

FIG. 11 is a front view of a lash bar incorporating features of the invention;

FIG. 14 is a side view of the railcar of the invention provided with a telescoping cover incorporating features of the invention;

FIG. 15 is a view taken along lines 15—15 of FIG. 14; and

FIGS. 16, 17 and 18 are sectional views having portions removed for purposes of clarity illustrating the sealing of the sections of telescoping cover shown in FIG. 14.

BRIEF DESCRIPTION OF THE INVENTION

Figure 3:
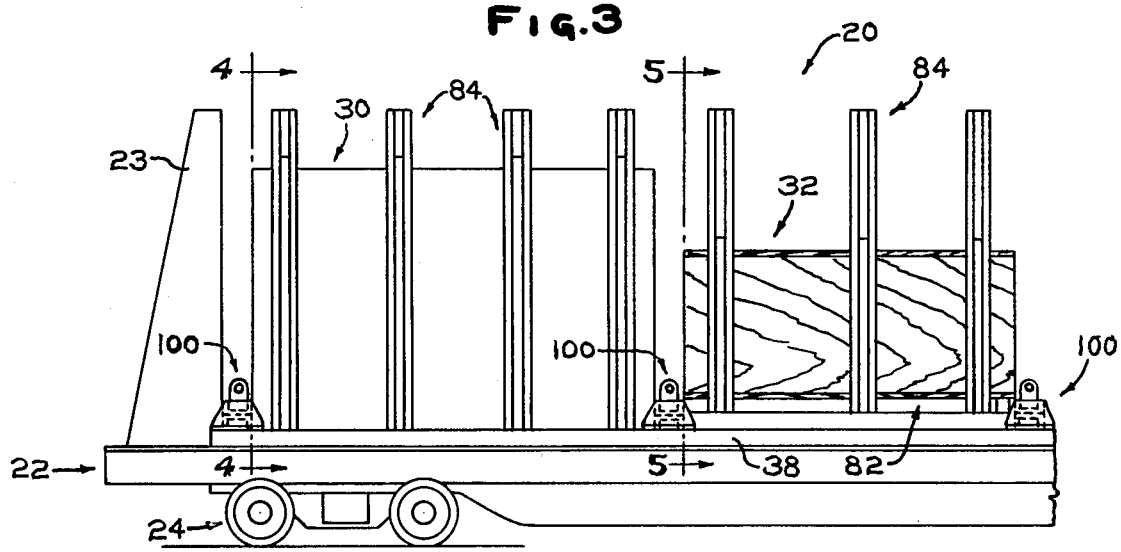
FIG. 3 is a view similar to FIG. 2 showing the railcar of the invention loaded with glass sheets and crates to be shipped.

In general, this invention relates to a railcar for shipping loose or individual sheet material and/or crates that is easy and economical to load and/or unload.

With reference to FIGS. 1 and 2, railcar 20 incorporating features of the invention includes a flat bed 22 having a pair of spaced bulkheads 23 and supported in any conventional manner at opposed ends by a wheel carriage 24 or trucks (one shown in FIG. 2). The flat bed 22, bulkheads 23 and wheel carriages 24 are of the type used in the railcar art and are not limiting to the invention.

Mounted on the flat bed 22 are a plurality of deck or floor runners 26 each having a stanchion 28 for supporting loose or individual sheet material 30, e.g., loose glass sheets and/or crates 32, e.g., glass packing crates as shown in FIGS. 3, 4, and 5.

With reference to FIGS. 6 and 7 the deck runners 26 each include a pair of side members 34 held in spaced relation by a pair of end plate members 36 to slideably receive an end of the stanchion 28 in a manner to be discussed below. The deck runners 26 are detachably secured on the flat bed 22 in any conventional manner to accommodate various lengths of sheets 30 and/or crates 32. For example, but not limiting to the invention, a pair of rigid longitudinal members 38 are secured to the bed 22 of the railcar 20 in spaced relation to receive the deck runners 26 therebetween as shown in FIGS. 1, 4 and 5.

With reference to FIGS. 4, 5, 6, and 7 the end plates 36 of the deck runners 26 and the rigid longitudinal members 38 are each provided with a plurality of holes 40 and 42, respectively, which are aligned to receive a nut and bolt or pin arrangement 44 (one shown in FIG. 4) to detachably secure the deck runner 26 between the rigid longitudinal members 38.

As can now be appreciated the deck runners 26 may be detachably secured directly to the flat bed 22 of the railcar 20. In the alternative, selected ones of the deck runners may be secured in place as by welding and plates 36 of the runners 26 to the longitudinal members 38.

Referring to FIGS. 8, 9 and 10, there is shown a preferred structure of the stanchions 26 that provide vertical support for the glass sheets 30 and crates 32 as shown in FIGS. 4 and 5. The stanchions 26 are constructed to give maximum stability while minimizing weight because increased weight of the stanchions reduces the allowable load to be shipped.

A stanchion 26 includes an engaging surface plate 46, side plates 48 and 50 and a backwall 52 joined together by angle irons 54. A portion of the backwall 52 has a groove 58 formed by a pair of angle irons 59 for receiving a restraining strap 60, shown in FIGS. 4 and 5, in a manner to be discussed below. The remaining portion of the backwall includes a plate 62.

The engaging surface 46 is preferably at an oblique angle to the plane of the deck runners 26 to provide packing stability and minimize small oscillatory forces that tend to move the sheets 30 about their supported edge 64 toward and away from the stanchions 26.

With specific reference to FIG. 9, opposed side plates 48 and 50 have a portion 66 and 67, respectively, insertable between the side members 34 of the deck runner 26 as shown in FIGS. 4 and 5. The stanchion 26 is detachably secured to the deck runners 26 by providing holes 68 in lower portions 66 and 67 of sides 48 and 50, respectively, of the stanchion and side holes 69 in the side members 34 of the deck runner 26 (see FIGS. 6 and 7). The holes 66 and 67 are aligned with the side holes 69 to receive a nut and bolt or pin assembly 70 as shown in FIGS. 4 and 5.

A supporting member 72 is preferably secured to each of the side plates 48 and 50 as shown in FIGS. 8 and 9 to support the stanchion 28 on the members 34 of the floor runner 26 to aid in sliding the stanchion along the floor runner 26 to align the holes and to reduce the shearing force acting on the nut and bolt assembly 70. A gusset plate 74 is secured adjacent the bottom of the stanchion as shown in FIGS. 4, 5, and 8 to provide additional structural stability to the stanchion 28.

The stanchions 28 are secured on the deck runners 26 such that the center of gravity of the load is at the longitudinal center of the railcar 26. Although in the preferred embodiment the stanchions 28 are detachably secured to the deck runners 26 for adjustment for various loads the invention is not limited thereto. For example, the stanchions may be permanently secured to the deck runners 26 adjacent an end of the runners. In this instance the center of gravity of the load is positioned at the longitudinal center of the railcar by building up the stanchion using dunnage, e.g., wood.

As shown in FIGS. 2, 8 and 9 each of the side plates 48 and 50 of the stanchions 28 are provided with a bifurcated member 76 for receiving an end of a turnbuckle 78. The turnbuckle provides structural stability to the stanchions when the railcar is empty.

The glass sheets 30 are loaded on the railcar using a sling and spreader bar assembly of the type used in the art, e.g., sold by Liftall of St. Manheim, Pa. The deck runners 26 maintain the supported edge 64 of the sheets 30 above the flat bed 22 of the railcar 20 to facilitate applying and/or removing the sling to the edges of the glass sheets.

With reference to FIGS. 3 and 5, the crates 30 are loaded on the railcar 20 by providing a raised floor 82 such that the supporting surface 46 of the stanchion 28 is normal to the raised floor 82. In this manner, the crates are supported at the bottom surface and back surface as shown in FIG. 5.

The railcar 20 of the instant invention is completely loaded and unloaded from one side thereby eliminating the drawbacks of the prior art railcars having an "A" frame mounted on a flat bed. More particularly, in the prior art, the railcar was unloaded from one side, and thereafter the railcar was turned around to unload from the other side. With the railcar of the instant invention, the railcar can be unloaded from one side thereby eliminating the time delay and economic drawbacks associated with turning the railcar around to unload same.

The discussion will now be directed to the restraining system to prevent movement of the sheets during shipment. With reference to FIGS. 4, 5, and 11, oscillatory motion of the sheets about the edge 64 and lateral motion of the sheets toward and away from the stanchions 28 is prevented by a lash bar 84 and the restraining strap 60. The lash bar 84 includes a pair of spaced elongated members 86 joined by struts 88.

With specific reference to FIGS. 4 and 5, the strap 60 has a looped end 90 secured between the side members 34 of the deck runners 26 by a pin 92. The course of the strap is around the outer surface of the struts 88 over the top of the sheets 30 or crates 32, through the stanchion 28 by way of holes 94 (see FIG. 9) over member 96 in the groove 58 of the stanchion 28 with the other end of the strap 60 secured to ratchet assembly 98 mounted on the backwall 52 of the stanchion 28 as shown in FIG. 8. Applying tension to the strap 60 by way of the ratchet assembly 98 urges the lash bar 84 and sheets 30 or crate 32 against the stanchion 28.

The lash bar 84 of the instant invention minimizes corner pressures on the glass sheets because the pressure is put on the struts 88. Further the lash bar 84 can be used for various load heights because of the spaced struts 88.

Longitudinal movement of the sheets 30 or crates 32 is prevented by end restraint 100 positioned on each side of the sheets or crates as shown in FIG. 3.

Figure 12:
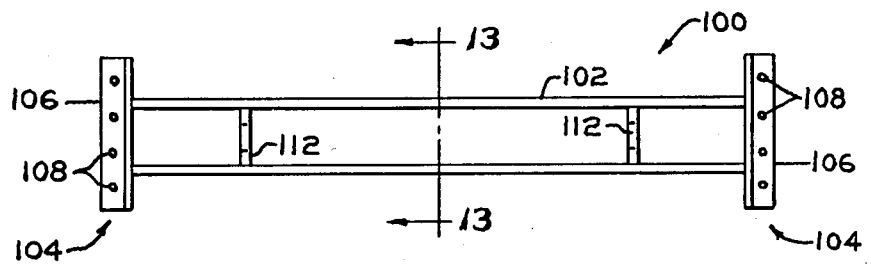
FIG. 12 is a plan view of an end restraint incorporating features of the invention.
Figure 13:
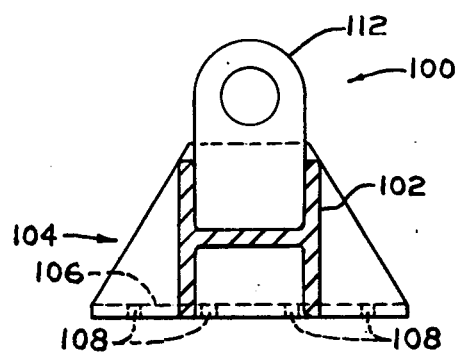
FIG. 13 is a view taken along lines 13—13 of FIG. 12.

Referring to FIGS. 12 and 13 the end restraint 100 includes an H or I shaped beam 102 having L shaped plates 104 at each end. Legs 106 of the plates 104 are provided with a series of holes 108 that are alignable with holes 110 of the longitudinal members 38 to receive a nut and bolt or pin assembly (not shown). A pair of spaced lift plates 112 are secured to the beam 102 to facilitate moving and positioning of the end restraint.

When the end restraint is slightly spaced from the ends of the glass sheets because of hole arrangement, dunnage such as wood may be used to minimize longitudinal movement of the sheets or crates.

As can be appreciated, when the sheets shipped are glass sheets, the contacting surfaces of the stanchions, lash bars, end restraint and deck runners are preferably provided with resilient material, e.g., rubber to prevent marring of the glass. In the instance of the end restraint it is preferred to use dunnage, e.g., wood between the beam 102 and edges of the glass. This is because the greatest force acting on the glass is in a direction parallel to the travel of the railcar, e.g., the longitudinal motion of the sheets.

The invention is not limited to the number of stanchions or deck runners used. However it is recommended that for glass sheets the distance between stanchions be less than about 3 feet (0.9 meter) to minimize bending moments acting on the glass sheets.

In the instance where the sheet material is effected by the weather, e.g., rain, sun or snow a cover should be provided. The cover may be any of the types used in the art. Shown in FIG. 14 is a preferred rigid cover 120. The cover 120 includes an outer right cover portion 122, an inner right cover portion 124, an inner left cover portion 126 and an outer left cover portion 128 slideably mounted on the flat bed 22 of the railcar 20.

The cover portions each have an inverted U-shaped configuration and sized such that the inner right cover portion 124 is slideable under the outer right cover portion 122 and the inner left cover portion 126 is slideable under the outer left cover portion 128. In this manner approximately 25 percent to 50 percent of the interior of the railcar is accessible at one time.

With reference to FIG. 15, the outer cover portions 122 and 128 are slideably mounted on a guideway 130 and the inner cover portions 124 and 126 are slideably mounted on guiderail 132 by way of wheels 134 and 136, respectively, mounted in housing 138 and 140, respectively. The guiderails 130 and 132 are mounted on the outside of the longitudinal members 38. The housing is attached to legs 142 and 144 of the outer and inner cover portions 122, 128 and 124,126 respectively as shown in FIG. 15 for cover portions 122 and 124.

A T-shaped member 146 is mounted between the guiderails 130 and 132 and over flanges 147 extending outward from the housings 140 and 142 as shown in FIG. 15 to maintain the covers on the railcar and to prevent water from splashing into the interior of the railcar.

Moisture is prevented from moving under the cover 120 by providing a resilient strip 148, e.g., rubber between the bulkheads 23 adjacent ends of the outer cover plate 122 and 128 as shown in FIG. 16 for the left side of railcar 20. The outer cover plates are urged against the adjacent bulkhead and held in position by a locking mechanism 149 of the type used in the art as shown in FIG. 14. The adjacent ends of the outer cover portions 122 and 128 and inner covers 124 and 126 are sealed by extending outer edge portion 150 of the outer cover plates inward and outer edge portion 152 of the inner cover plates outward as shown in FIG. 17 for cover portions 126 and 128. A resilient strip 154 is adhered to the inner wall of the outer cover portion 128 and compressed by the end 152 of the inner cover portions 126.

Adjacent ends of the inner cover portions 124 and 126 are sealed by forming the adjacent ends of the inner cover portions such that the end 156 of left inner cover portion 126 slides under the end 158 of the inner right cover portion 124 into engagement with a resilient pad 160 mounted on the inner wall of the inner right cover portion 124 as shown in FIG. 18.

A locking mechanism 160 similar to locking mechanism 149 urges the inner cover portions together to compress the resilient pad 160 and urges the inner cover plates away from their adjacent outer cover portions to compress the resilient strip 154.

As can be appreciated the invention is not limited to the construction of the cover 120 and that the construction of the cover can be modified within the scope of the invention.

DETAILED DESCRIPTION OF THE INVENTION

The railcar of the instant invention will be used to ship 80 loose glass sheets having dimensions of 130 inches (3.3 meters)×168 inches (4.2 meters)×¼ inch (0.635 centimeter) (hereinafter referred to as Group A glass sheets); 156 loose glass sheets having dimensions of 130 inches (3.3 meters)×144 inches (3.7 meters)× ¼ inch (0.635 centimeter) (hereinafter referred to as Group B glass sheets) and 8 crates of glass sheets having a parallelpiped shape and dimensions of 80 inches (2.0 meters)×100 inches (2.5 meters)×7 inches (17.8 centimeters).

With reference to FIG. 1, a railcar 20 has a flat bed 22 having dimensions of 60 feet (18.2 meters)×10½ feet (3.2 meters) supported on wheel carriages 24 or trucks of the type used in the art has a pair of spaced bulkheads 23 secured to the bed. A pair of "C" shaped longitudinal members 38 (AISC MC7×19.1) having a length of about 48½ feet (14.8 meters) and spaced about 8 1/6 feet (2.4 meters) apart are secured to the flat bed of the car between the bulkheads. The members 38 are provided with 5/16 inch (7.8 millimeters) diameter holes 42 in the central portion and holes 110 in the upper leg on a center-to-center spacing of 6 inches (17 centimeters) as shown in FIGS. 4 and 5.

With reference to FIG. 15, a pair of guiderails 130 and 132, 48½ feet (14.8 meters) in length are secured to the bed of the railcar and spaced 5 inches (12.5 centimeters) and 2 inches (5.08 centimeters), respectively, from the adjacent member 38. The guiderails are made of 1½ inch (3.9 centimeters)×1½ inch (3.9 centimeters) angle iron 3/16 inch (5 millimeters) thick.

A pair of outer cover portions 122 and 128 and inner cover portions 124 and 126 having an inverted U-shaped are slideably mounted on the guiderail by wheels 134 and 136. The wheels 134 and 132 are rotatably mounted in housing 138 and 140, attached to sides 142 and 144 of the cover portions 122 and 128 and 124, 126, respectively, (one side only shown in FIG. 15). A ¼ inch (0.62 centimeter) thick "T" shaped plate 146 is mounted between the guiderails 130 and 132 and flanges 147 extending from housings 138 and 140.

The outer cover portions 122 and 128 are made of fiber glass and have a length of 12½ feet (3.8 meters), a height of 15 feet (4.6 meters) at their highest point and sides spaced 9⅔ feet (2.9 meters). The inner cover portions 124 and 126 are also made of fiber glass and have a length of 12½ feet (3.8 meters), a height of 14½ feet (4.4 meters) at their highest point and sides spaced 8 5/6 feet (2.7 meters) apart such that the inner cover portions 124 and 126 are slideable in the outer cover portions 122 and 128.

With reference to FIG. 17, end 152 of the inner cover portions 124 and 126 is captured in adjacent end 150 of adjacent outer cover portion 122 and 128, respectively, by providing that the end 150 of the outer cover portions 122 and 128 is angled toward the inner cover portions 124 and 126 and the end 152 of the inner cover portions 124 and 126 is angled toward the outer cover portions as shown in FIG. 17 for cover portions 126 and 128. A strip of rubber 154 is provided in the area where the end 152 of the inner cover portion 124 and 126 engages the outer cover portions 122 and 128.

As shown in FIG. 16, a rubber strip 148 is secured to the bulkhead 23 and engaged by the end of the outer cover portion 122. A similar arrangement is provided at the other end of the railcar 20.

The adjacent ends 156 and 158 of the inner cover portions 126 and 128, respectively, slide over one another as shown in FIG. 18 with the end 156 of the left inner cover portion 126 engaging a rubber pad 160 mounted on the inner surface of the inner cover portion 124 as shown in FIG. 18.

Referring now to FIGS. 1, 6 and 7, a plurality of deck runners 26 are mounted between the rigid longitudinal members 38. Each deck runner 26 includes a pair of AISC MC7×19.1 steel channels 34 joined at their ends by an end plate 36. The channels 34 are 8½ feet (2.4 meters) in length and spaced 1 foot (0.3 meter) apart. The end plates 36 are made of ⅜ inch (0.95 centimeter) thick steel having dimensions of 6⅝ inches (17 centimeters)×2 feet (0.6 meter). The end plates have ¼ inch (0.63 centimeter) holes 40 which are alignable with holes 110 of the longitudinal runners 38 to receive nut and bolt assembly 44 to secure the deck runners in position as shown in FIGS. 4 and 5.

With reference to FIG. 2, a stanchion 28 is mounted on each of the deck runners. As shown in FIGS. 8, 9 and 10 each of the stanchions are 11 feet (3.3 meters) high and include a ¼ inch (0.63 centimeter) thick steel plates 46, 48, 50 and 62 joined together by ¼ inch (0.63 centimeter) thick 3 inch (7.62 centimeters)×3 inches (7.62 centimeters) steel angle irons 54. The top end of the stanchion 28 viewed in FIGS. 8 and 9 have dimensions of 1 foot (0.3 meter) by 9 inches (0.2 meter) and dimensions of 1 foot (0.3 meter) by 1⅝ feet (0.5 meter) at 164 adjacent the bottom end to provide a 5 degree slope to the engaging surface plate 46 of the stanchion 28.

A guideway or channel 58, 4⅝ inches (11.8 centimeters) wide and 6 feet (1.2 meters) is provided on the back or left side of the stanchion as the stanchion is viewed in FIGS. 8 and 10. Steel tubing 96, ¼ inch (0.63 centimeter) thick and 2½ inches (6.4 centimeters)×1¼ inches (3.2 centimeters) on a center-to-center spacing of 1 foot (0.3 meter) is provided in the guideway 58 to define the course of the retaining strap 60 as shown in FIGS. 4 and 5. A ratchet device 98 of the type used in the art is mounted below the guideway 58.

A portion 67 of the side plates 48 and 50 extend 5 inches (12.7 centimeters) beyond the plates 62 and 46 and are insertable in the deck runners 26. Holes 68 in the portions 67 are ¼ inch (0.62 centimeter) in diameter, on a center-to-center spacing of 3 inches (7.6 centimeters) are alignable with holes 69 of the deck runners (see FIGS. 6 and 7) to receive a nut and bolt assembly 70 as shown in FIGS. 4 and 5.

With reference to FIGS. 8 and 9, 1½ inches (3.8 centimeters)×1 inch (2.54 centimeters) and 1 foot (0.3 meter) long steel member 72 is secured to the sides 48 and 50 of the stanchion 28 at 164 to aid in sliding the stanchion along the deck runners 28 and reduce shearing forces acting on the nut and bolt assembly 70. Holes 94, 8 inches (20 centimeters)×4 inches (10 centimeters) are provided in the plate 46 for passing the restraining strap 60 through the stanchion to the guideway 58.

Steel gussets 74 made of ¼ inch (0.63 centimeter) thick steel triangular plates having a base of 4½ inches (11.3 centimeters) by 2 feet (0.6 meter) high are secured to each side of the stanchion 28 as shown in FIG. 8.

The engaging surface or the plate 46 and the engaging surface of the deck runners 26 is provided with rubber (not shown) to prevent marring of the glass sheets to be loaded.

Provided on each side plate 48 and 50 of the stanchion is a bifurcated member 76 for receiving one end of a turnbuckle 78 (see FIG. 2) of the type used in the art to provide structural stability for aligned stanchions when the railcar is empty.

The discussion will now be directed to loading the Group A glass sheets on the left side of the railcar 20 as viewed in FIGS. 1 and 14. The cover portions 124, 126, and 128 are slid to the right end of the railcar 22 as viewed in FIG. 14.

With reference to FIGS. 3, 12 and 13, an end restraint 100 having a W12×65 shaped beam 7⅝ feet (2.3 meters) long and ½ inch (1.27 centimeters) thick steel L-shaped plates 104 on each end is mounted adjacent the left bulkhead 23 as viewed in FIG. 1. The legs 106 of the plate 104 is 3½ inches (8.8 centimeters) wide 2 feet (0.6 meters) long and is provided with ¼ inch (0.63 centimeter) holes 108 which are alignable with holes 110 of the longitudinal members 38 to a receiving nut and bolt assembly.

The stanchion 28 and deck runner 26 assembly is spaced 8 inches (20 centimeters) from the end restraint 100. Thereafter 4 stanchions 28 and deck runner 26 assemblies are secured in place on a 3 foot (0.9 meter) center-to-center spacing.

Each of the stanchions 28 are spaced 1 foot (0.3 meter) from the longitudinal center of the railcar to position the center of gravity of the Group A sheet at the longitudinal center of the railcar.

Dunnage, e.g., wood, is positioned against the end restraint and the glass sheets are loaded onto the deck runners in packs of 20 using a sling and spreader bar of the type known in the art. A 1½ inch (3.7 centimeters) thick polyethylene strip (not shown) is placed between each pack to facilitate removal and insertion of the slings to unload the glass sheets. The glass sheets are supported in a vertical position with the bottom edge 64 resting on the deck runners 26 and the stanchions maintaining the glass sheets in the vertical position as shown in FIG. 4.

An end restraint 100 is then secured on the longitudinal members 38 with dunnage between the end restraints and glass.

With reference to FIG. 4, looped end 90 of restraining strap 60 is secured in each of the deck runners 28 by a pin 92.

With reference to FIGS. 4 and 11, a lash bar 84 has an end mounted in each of the deck runners 26. The lash bar includes a pair of 11½ feet (34 meters) long ¼ inch (0.63 centimeter) thick 4 inches (10 centimeters)×4 inches (10 centimeters) aluminum tubing 86 held in spaced relation by a plurality of 11½ inches (0.3 meter) long, 1 inch (2.54 centimeters) inside diameter, ¼ inch (0.63 centimeter) thick aluminum tubing spaced 1 foot (0.3 meter) apart. Foam rubber (not shown) is provided between the lash bar and glass sheets.

With reference to FIG. 4, the strap 60 has its course over the outer surfaces of the tubing 88 over the glass sheets through the stanchion over the member 96 in the guideway 58 and has the end secured to the ratchet 98. Rotating the ratchet in a first direction urges the lash bars and glass sheets against the stanchion.

The end restraints prevent longitudinal motion of the glass sheets during shipment.

The cover portions 122, 124, 126 and 128 are slid to the left side of the railcar to load the Group B sheets on the right side of the railcar as viewed in FIGS. 1 and 14.

The Group B glass sheets are loaded in a similar manner as the Group A glass sheets except the supporting surface of the stanchions are spaced 2 feet (0.6 meter) from the longitudinal center of the railcar and stacks of 26 sheets are loaded and separated by spacers.

The outer and inner right cover portions 122 and 124, respectively, are slid to the right to load the crates 32 about the lateral center of the railcar. Three stanchion and deck runner 26 assemblies are spaced 3 feet (0.9 meter) apart about the lateral center of the railcar. The stanchions 28 are spaced 2⅔ feet (0.8 meter) from the longitudinal center of the railcar. Thereafter a floor, e.g., a wooden floor 82 is mounted on the deck runners such that the surface of the floor 82 and the supporting surface of the stanchion form a 90 degree angle as shown in FIG. 5. The end restraints and lash bars are applied as previously discussed for the glass sheets to secure the crates to the railcar.

With reference to FIG. 14, the outer cover portions 122 and 128 are secured to their adjacent bulkhead 23 by locking mechanism 162 and adjacent ends of the inner cover portions are held together by locking mechanism 162. The railcar is now ready for shipment.

The glass sheets and crates are unloaded in the reverse manner in which they were loaded but not necessarily in that order.

The invention is not limited to the specific example discussed and the example was presented for illustration purposes only.

What is claimed is:

1. A method of loading at least one article having a predetermined length and weight on a railcar having a pair of spaced longitudinal runners mounted on the bed of the railcar comprising:

positioning between the longitudinal runners a plurality of lateral deck runners spaced a distance less than the length of the at least one article for supporting the at least one article;

securing the lateral deck runners in position;

positioning a stanchion on selected ones of the lateral deck runners such that the combined weight of the at least one article supported by the stanchion and the stanchion have a center of gravity approximately at the longitudinal center of the railcar;

securing the stanchion in position to its respective lateral deck runner;

loading the at least one article on the lateral deck runners and respective stanchion; and securing the at least one article in position to prevent longitudinal, vertical and lateral movement of the at least one article relative to the lateral deck runners.

2. The method as set forth in claim 1 wherein the at least one article is individual glass sheets.

* * * * *